United States Patent
Kim

(10) Patent No.: US 8,024,097 B2
(45) Date of Patent: Sep. 20, 2011

(54) AUTOMOBILE OPERATION APPARATUS AND METHOD DESIGNED FOR FAILURE OF DRIVE GEAR OF AUTOMATIC TRANSMISSION

(75) Inventor: Mulshi Kim, Bundang-Gu (KR)

(73) Assignee: Delphi Technologies, Inc., Troy, MI (US)

( * ) Notice: Subject to any disclaimer, the term of this patent is extended or adjusted under 35 U.S.C. 154(b) by 289 days.

(21) Appl. No.: 12/269,122

(22) Filed: Nov. 12, 2008

(65) Prior Publication Data

US 2009/0138165 A1    May 28, 2009

(51) Int. Cl.
*F16H 61/12* (2010.01)
(52) U.S. Cl. .......................... 701/62; 477/97
(58) Field of Classification Search .............. 701/52, 701/62–64; 74/335; 477/97
See application file for complete search history.

(56) References Cited

U.S. PATENT DOCUMENTS

| 4,561,055 A * | 12/1985 | McKee .......................... 701/52 |
| 6,199,003 B1 * | 3/2001 | Hollingsworth et al. ....... 701/52 |
| 6,524,221 B2 * | 2/2003 | Nishimura ...................... 477/97 |
| 7,406,889 B2 * | 8/2008 | Okawa ............................. 74/335 |
| 2005/0022621 A1 * | 2/2005 | Kusano ........................... 74/335 |
| 2008/0033861 A1 * | 2/2008 | Jeon ............................... 705/37 |
| 2008/0208419 A1 * | 8/2008 | Wolf et al. ...................... 701/52 |

* cited by examiner

*Primary Examiner* — Thomas Black
*Assistant Examiner* — Marthe Marc Coleman
(74) *Attorney, Agent, or Firm* — Thomas N. Twomey

(57) ABSTRACT

Provided is an automobile operation apparatus and method designed for detecting failure of a drive gear selector of an automatic transmission having a normal mode constituted by P, R, N and D gears, and a sport mode. The automobile operation apparatus includes up/down switches for shifting a gear of the automatic transmission up or down when a gearshift lever is shifted from the normal mode to the sport mode, a detection means for detecting whether the gearshift lever is shifted to the sport mode, and a control means for controlling a D gear operation at the up/down switches when the D gear is abnormal and the detection means detects a mode change. Therefore, an automobile can be driven, even when a D gear for forward driving malfunctions, by a virtual drive mode switch that is equivalent to the D gear in an emergency.

2 Claims, 6 Drawing Sheets

# AUTOMOBILE OPERATION APPARATUS AND METHOD DESIGNED FOR FAILURE OF DRIVE GEAR OF AUTOMATIC TRANSMISSION

CROSS-REFERENCE TO RELATED APPLICATION

This application claims the benefit of Korean Patent Application No. 2007-116256, filed Nov. 14, 2007, the disclosure of which is hereby incorporated herein by reference in its entirety.

BACKGROUND OF THE INVENTION

1. Field of the Invention

The present invention relates to an automobile operation apparatus and method designed for detecting failure of a drive gear selector of an automatic transmission, and more particularly, to an automobile operation apparatus and method capable of operating an automobile having a sport mode when a drive gear of the automobile malfunctions.

2. Description of the Related Art

In general, some automatic transmission vehicles include P, R, N, D, 2 and L gears, and other automatic transmission vehicles include an automatic transmission having a normal mode constituted by P, R, N and D gears and a sport mode manually operated by a gearshift lever.

The automatic transmission having the sport mode includes P, R, N and D gears and up/down switches such as + and − switches. A driver may automatically drive the automobile in a state in which a gearshift lever is in the D gear as a forward shift, or manually drive the automobile by moving the gearshift lever to the sport mode and operating the up(+) or down(−) switch step by step to vary the speed of the automobile.

In the manual gearshift of the automatic transmission, an inhibitor switch detects a shift gear position of the gearshift lever to control a shift pattern appropriate to the P, R, N and D gears, and determines whether a selector switch is in the sport mode or the normal mode in the D gear.

The automatic transmission including the sport mode, as shown in FIG. 1, includes a gearshift lever having a down switch 11 for downshifting, an up switch 12 for upshifting, and a selection switch 13 for detecting whether the sport mode is selected or not.

In addition, a cluster 14 detects the current shift gear to transmit it to a transmission control unit (TCU) 16.

In the sport mode vehicle, gear signals input into the TCU 16 correspond to P, R, N and D gears. In the D gear, an inhibitor switch 15 does not immediately input a D gear signal to the TCU 16 but first determines whether a sport mode selection switch 13 installed between the TCU 16 and the inhibitor switch 15 is switched to a normal mode or sport mode of the D gear.

In the automobile having the sport mode, when there is no signal for P, R, N and D gears and the sport mode selection switch 13 is ON, the TCU 16 determines that the switch 13 is in the sport mode.

In addition, when the inhibitor switch 15 is normal and the sport mode selection switch 13 malfunctions, or when a signal line between the inhibitor switch 15 and the sport mode selection switch 13 is cut such that a selected mode is not input into the TCU 16, the TCU 14 performs determination according to control logic.

When a state in which a signal from the inhibitor switch 15 is not detected, or a plurality of signals are simultaneously detected the control logic allows the TCU 16 to perform control depending on a signal just before the state. Further, after the above state reverts to the normal state, the TCU 16 performs control on the basis of the detection signal.

Therefore, when it is determined that the sport mode selection switch 13 malfunctions according to malfunction determination conditions of the inhibitor switch 15, since control just before the above state is performed, control depending on any one of the P, R, N and D gears is performed.

Meanwhile, Document 1 discloses a "Method for Controlling Automatic Transmission During Fault of Sports Mode Select Switch for Vehicle," which is shown in FIG. 2.

As shown in FIG. 2, in the method for controlling an automatic transmission during fault of a sports mode select switch for an automobile, while the automobile is moving or stopped, a driver shifts a gearshift lever to a "D" gear and selects a normal mode or a sport mode.

That is, when the gearshift lever is positioned at the "D" gear, the inhibitor switch transmits a "D" gear selection signal to a TCU, and then the select switch is operated to select a normal mode or a sport mode.

When the driver selects the sport mode, the TCU checks whether one of up/down switches is input.

In addition, when it is checked that one of the up/down switches is input, the TCU allows entry into the sport mode such that the driver shifts the gearshift lever up/down. Further, the entry into the sport mode is allowed even though a "D" gear inhibitor switch signal of the gearshift lever is not input. At this time, when P, R and N inhibitor switch signals are input for a certain time, the TCU blocks entry into the sport mode and maintains the normal mode.

In the "D" gear, when the select switch is positioned at the sport mode and the up/down switches are simultaneously input, the TCT determines that the up/down switches are malfunctioning and blocks entry into the sport mode.

That is, entry inhibition conditions of the sport mode are set to the case that the up/down switches are simultaneously input for a certain time in the sport mode, and the case that the up/down switches are input for a certain time while the inhibitor switch signals of the P, R and N gears are input.

In the failure determination control logic, when the driver selects the sport mode and turns on the up/down switches upon failure of the inhibitor switch, the TCU checks the P, R and N inhibitor switch signals. When there is no signal input, the TCU determines that the gearshift lever is positioned at the "D" gear, enters the sport mode, and maintains a normal running state.

In addition, when any one of the up/down switches malfunctions, a sport mode signal of the select switch and signals of the up/down switches are simultaneously input. In this case, the TCU determines that the up/down switches are malfunctioning, blocks entry into the sport mode, and maintains the normal mode.

Further, Document 2 discloses a "Breakdown Control Method When Sports Mode Selection of Automobile Automatic Transmission," which is shown in FIG. 3.

As shown in FIG. 3, in the breakdown control method when a sports mode selection of an automobile automatic transmission, a TCU resets a timer to determine whether the sport mode is operating normally, and the timer continuously counts a time from a reset point (ST20).

In addition, the TCU determines whether a P gear signal detected and transmitted by an inhibitor switch is input (ST21), and the TCU determines whether a gear signal of the inhibitor switch corresponds to one of P, R, N and D gears or the sport mode (ST22 to ST25).

In steps ST21 to ST25, when at least one gear signal is input from the inhibitor switch, the TCU determines that the inhibitor switch is operating normally and stops failure determination.

Meanwhile, in steps ST21 to ST25, when no gear signal is input from the inhibitor switch, the TCU determines whether there is a signal applied from an up switch or a down switch.

An upshift signal and a downshift signal are applied from the up switch and the down switch, respectively (ST26).

When neither of the upshift signal and the downshift signal is input in step S26, the TCU determines whether the time counted by the timer exceeds a set threshold time (ST27).

When it is determined that the counted time of the timer exceeds the thresholdl time, the TCU returns to step ST21 to repeatedly determine whether a gear signal of the inhibitor switch is output (ST27).

As described above, the threshold time is set to designate a minimum reference time for determining no signal detection of the inhibitor switch.

In addition, when the counted time of the timer exceeds the threshold time in step ST27, the TCU performs gearshift control depending on a prior gearshift stage corresponding to a gear signal last detected by the inhibitor switch (ST28).

Meanwhile, when at least one of the upshift signal or the downshift signal is applied in step ST26, the TCU determines that the gearshift is a first speed to perform gearshift control (ST29).

Further, when the first speed control is performed in step S29, the TCU determines whether the upshift signal or the downshift signal is continuously input by acceleration or deceleration of the driver (ST30).

When the upshift signal or the downshift signal is input in step ST30, the TCU performs gearshift control according to a regular shift pattern (ST31).

However, in the conventional automatic transmission including the sport mode, contact failure of the inhibitor switch and the gearshift lever makes it impossible to drive the automobile. When tension of a cable connected to the gearshift lever is loosened or cut, the gearshift lever cannot be shifted and the automobile becomes undrivable.

In addition, under the condition that a signal from any one of the P, R, N and D gears of the inhibitor switch is not detected, the automobile can be driven by determining that the gearshift lever is positioned at a first speed on the basis of a signal detected from any one gear of the up/down switches of the sport mode. However, when a signal from any one gear of the inhibitor switch is detected, the automobile is disabled. In addition, when only the D gear of the sport mode malfunctions upon signal detection from any one gear, the automobile may be disabled.

Meanwhile, in the technology described in Document 2, when the inhibitor switch signal of the D gear is not detected, the automobile can be driven after the gearshift lever is positioned at the sport mode and then any one signal of the up/down switch of the sport mode is detected. Therefore, when a signal from the D gear and the up/down switches of the sport mode is not detected, the automobile may be disabled.

[Document 1] Korean Patent Laid-open Publication No. 2002-49231 (Jun. 26, 2002)
[Document 2] Korean Patent Laid-open Publication No. 2007-62010 (Jun. 15, 2007)

SUMMARY OF THE INVENTION

An aspect of the present invention provides an automobile operation apparatus and method designed for detecting failure of a drive gear selector of an automatic transmission for forward driving that enable driving of an automobile by moving only a gearshift lever when the automobile cannot be driven due to failure of the drive gear (D gear).

Another aspect of the invention provides an automobile operation apparatus and method designed for detecting failure of a drive gear selector of an automatic transmission that are capable of connecting a virtual drive mode switch that is equivalent to the D gear in parallel to drive the automobile just after failure of the D gear.

The present invention provides an automobile operation apparatus designed for detecting failure of a drive gear selector of an automatic transmission having a normal mode constituted by P, R, N and D gears, and a sport mode, the apparatus including: up/down switches for shifting a gear of the automatic transmission up or down when a gearshift lever is shifted from the normal mode to the sport mode; a detection means for detecting whether the gearshift lever is shifted to the sport mode; and a control means for controlling a D gear operation at the up/down switches when the D gear is abnormal and the detection means detects a mode change.

In addition, the present invention provides an automobile operation method designed for detecting failure of a drive gear selector of an automatic transmission having a normal mode constituted by P, R, N and D gears, and a sport mode, the method including: a drive control step of controlling a D gear operation when the D gear is abnormal and a gearshift lever is shifted from the normal mode to the sport mode.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described with reference to the accompanying drawings.

Figure 1:
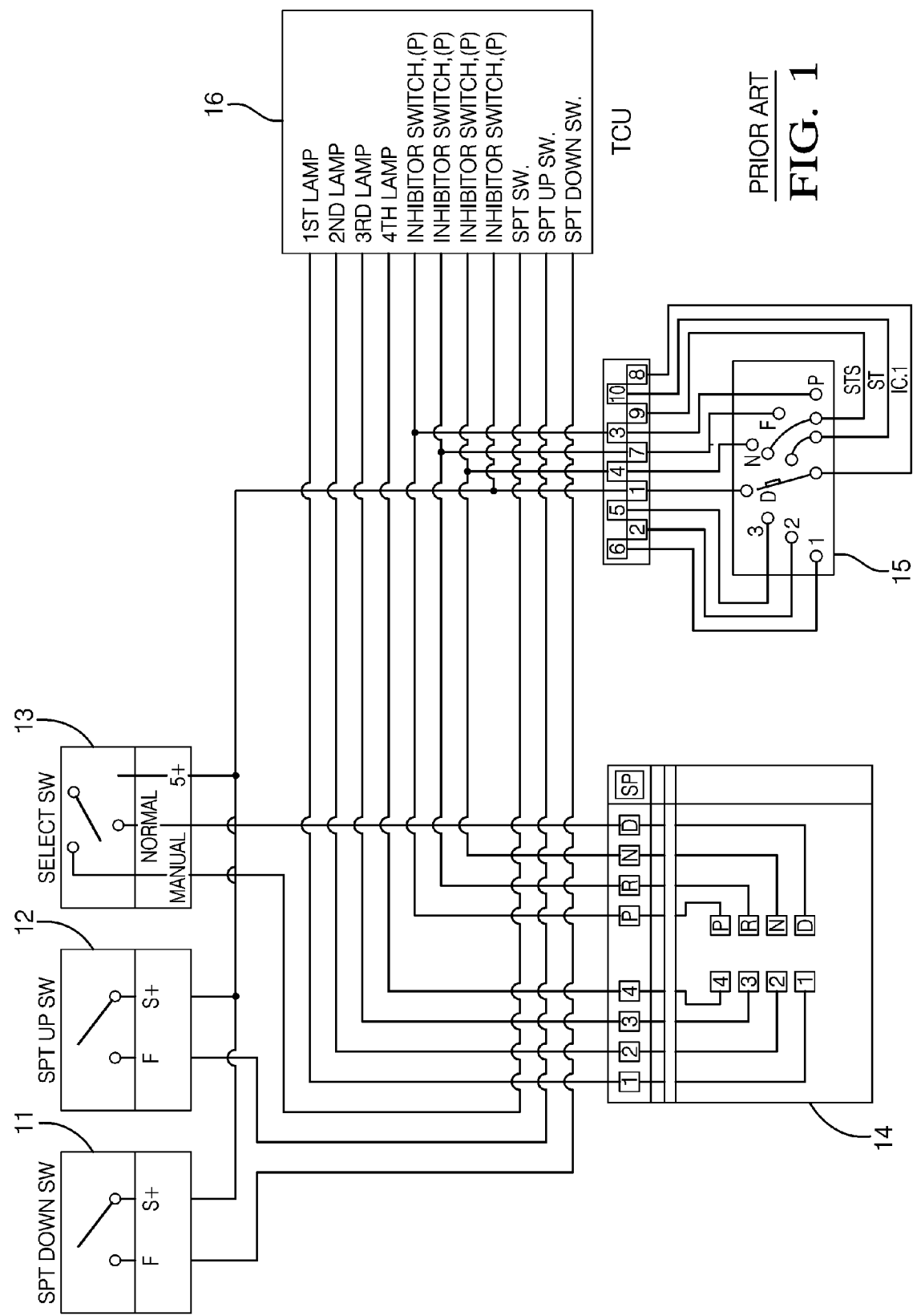
FIG. 1 is a schematic view of a conventional automatic transmission having a sport mode.
Figure 2:
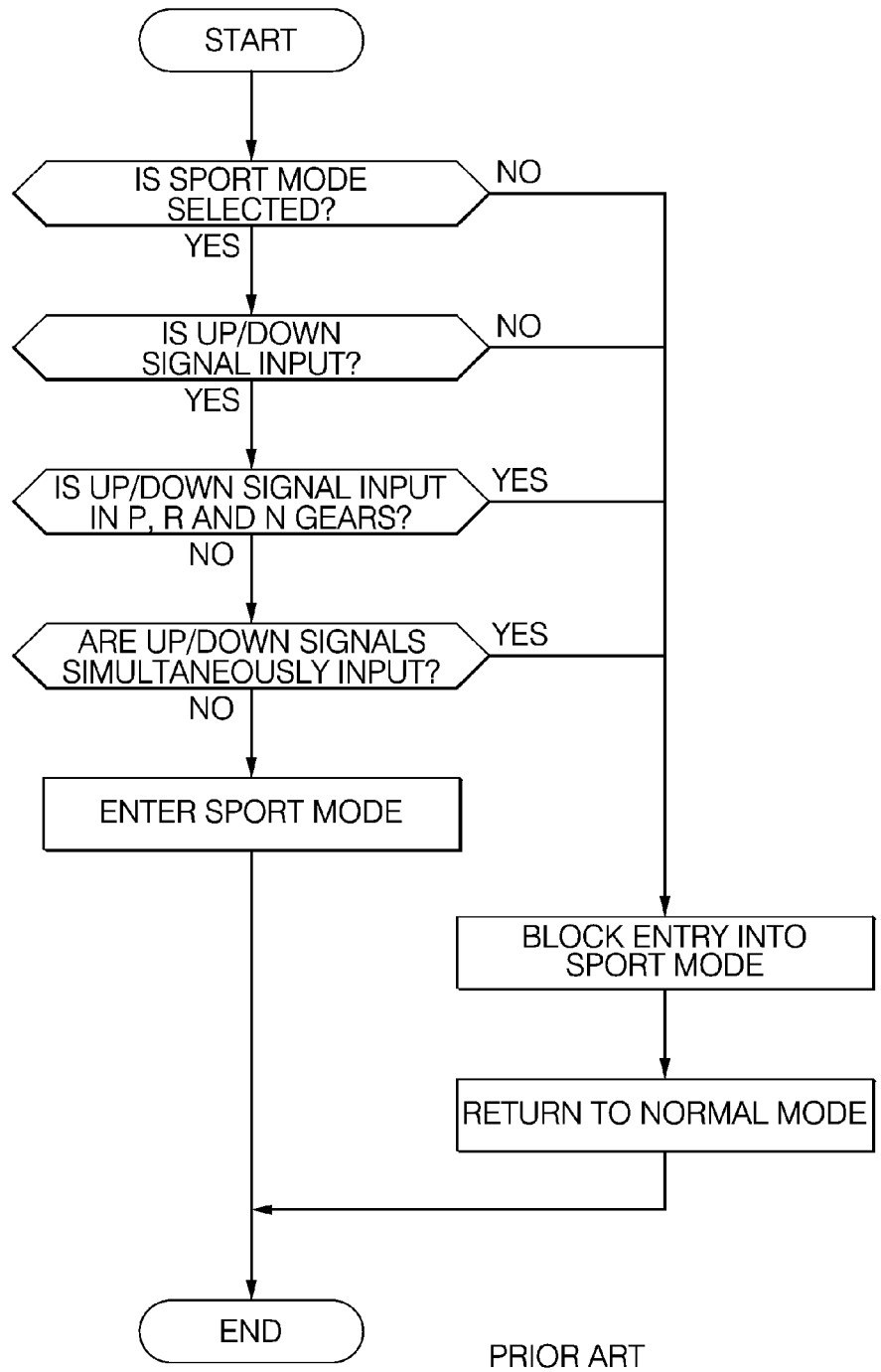
FIG. 2 is a flowchart showing a failure control method when the sport mode of the conventional automatic transmission is selected.
Figure 3:
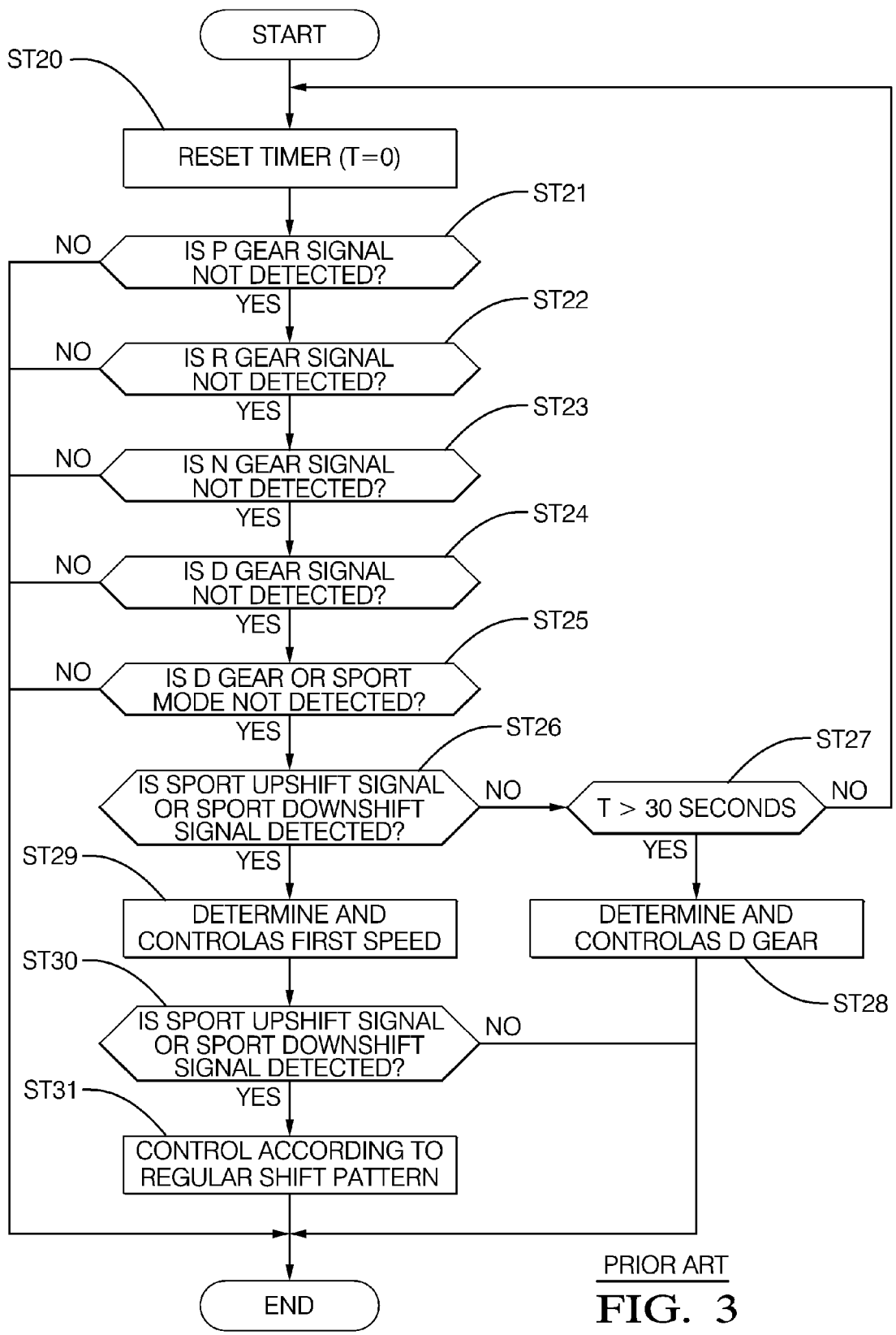
FIG. 3 is a flowchart of a control method designed for failure of the sport mode of the conventional automatic transmission.
Figure 4:
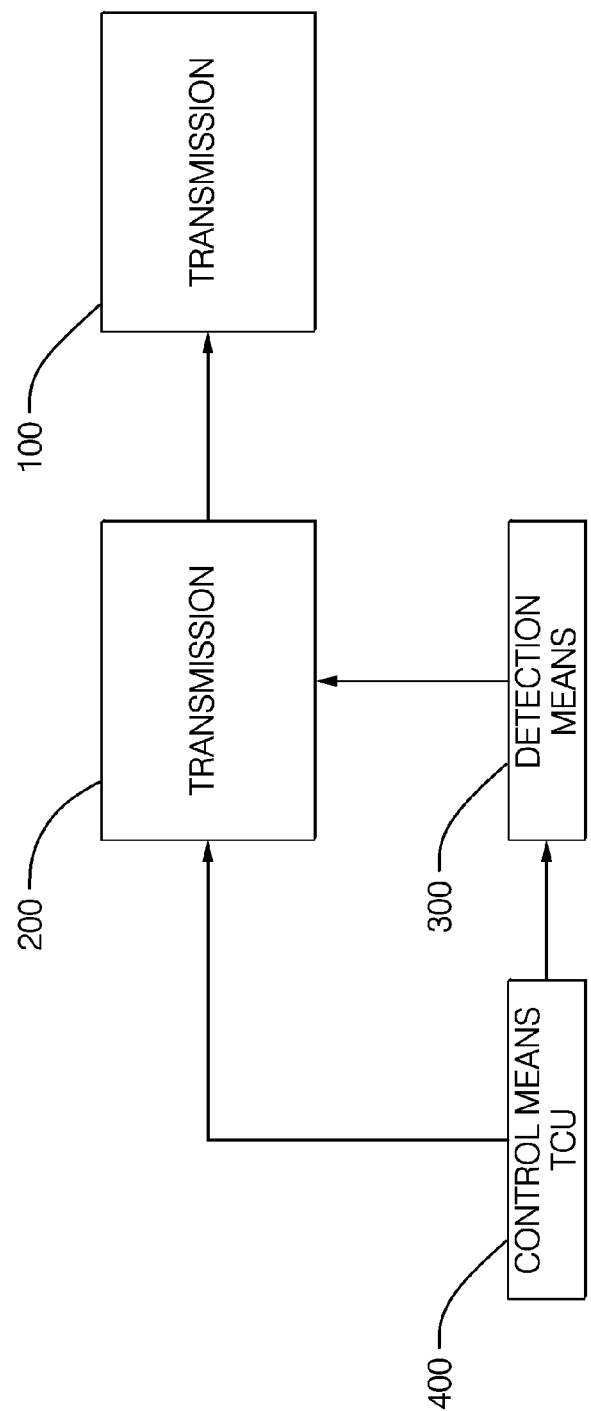
FIG. 4 is a block diagram of an automatic transmission in accordance with an exemplary embodiment of the present invention.

FIG. 4 is a block diagram of an automatic transmission in accordance with an exemplary embodiment of the present invention.

As shown in FIG. 4, an automatic transmission in accordance with the present invention includes an engine 100 for generating power, a transmission 200 in which a gear is shifted to increase or decrease a rotational force output from the engine 100, a detection means 300 for detecting whether a gearshift lever installed at the transmission 200 is shifted from a normal mode to a sport mode, and a control means 400 for controlling the transmission 200 according to a detection signal of the detection means 300.

Figure 5:
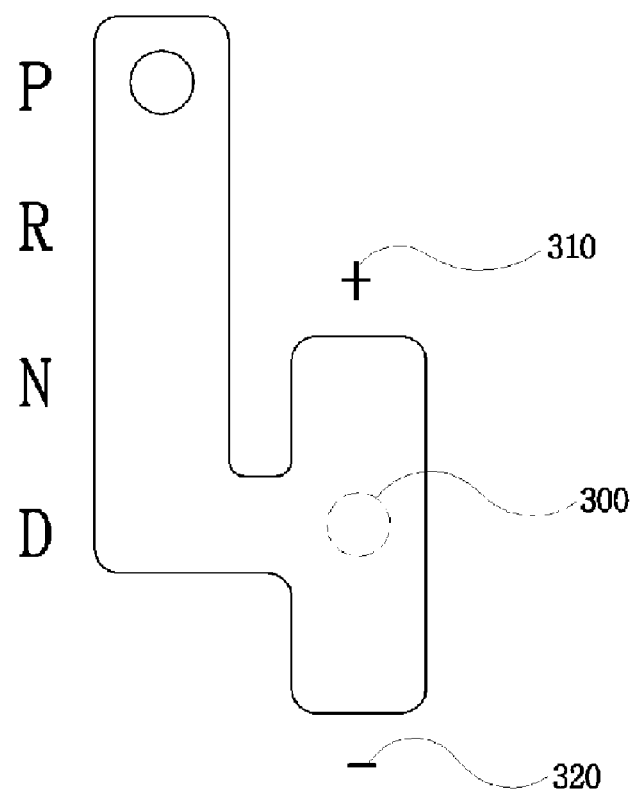
FIG. 5 is a diagram of an example in which a detection means shown in FIG. 4 is mounted.

FIG. 5 is a diagram of an example in which a detection means shown in FIG. 4 is mounted.

As shown in FIG. 5, an automobile operation apparatus in accordance with an exemplary embodiment of the present invention includes the detection means 300 installed at a sport mode section having up/down switches 310 and 320.

The detection means 300 for detecting shifting of the gearshift lever may be a sensor for detecting whether the gearshift lever is shifted from the normal mode to the sport mode and sending a control signal to the control means 400 when the D gear of the normal mode of the automatic transmission malfunctions.

The detection means 300 may detect an ON/OFF state of a virtual drive mode switch for detecting whether the gearshift lever is shifted from the normal mode to the sport mode, between the up switch 310 and the down switch 320 of the sport mode.

The virtual drive mode switch is controlled by the control means 400 such as a TCU to detect a shift operation of the gearshift lever when the D gear of the normal mode operates normally, and to detect shifting of the gear shift lever when it is shifted from the normal mode to the sport mode in the case that the D gear of the normal mode operates abnormally.

The control means 400 controls the detection means 300 to detect whether the D gear of the P, R, N and D gears of the automatic transmission malfunctions. When the D gear operates normally, the control means 400 controls the automobile in the normal mode.

In addition, the control means 400 controls the detection means 300 to detect whether the gearshift lever is shifted from the normal mode to the sport mode when the D gear malfunctions, thereby shifting the gearshift lever and enabling the automobile to be driven.

That is, when a driver shifts the gearshift lever from the normal mode to the sport mode in a state in which the D gear malfunctions, the control means 400 detects the shift of the gearshift lever and controls the automobile like the D gear of the normal mode.

Hereinafter, an automobile operation method in accordance with an exemplary embodiment of the present invention will be described with reference to FIG. 6.

Figure 6:
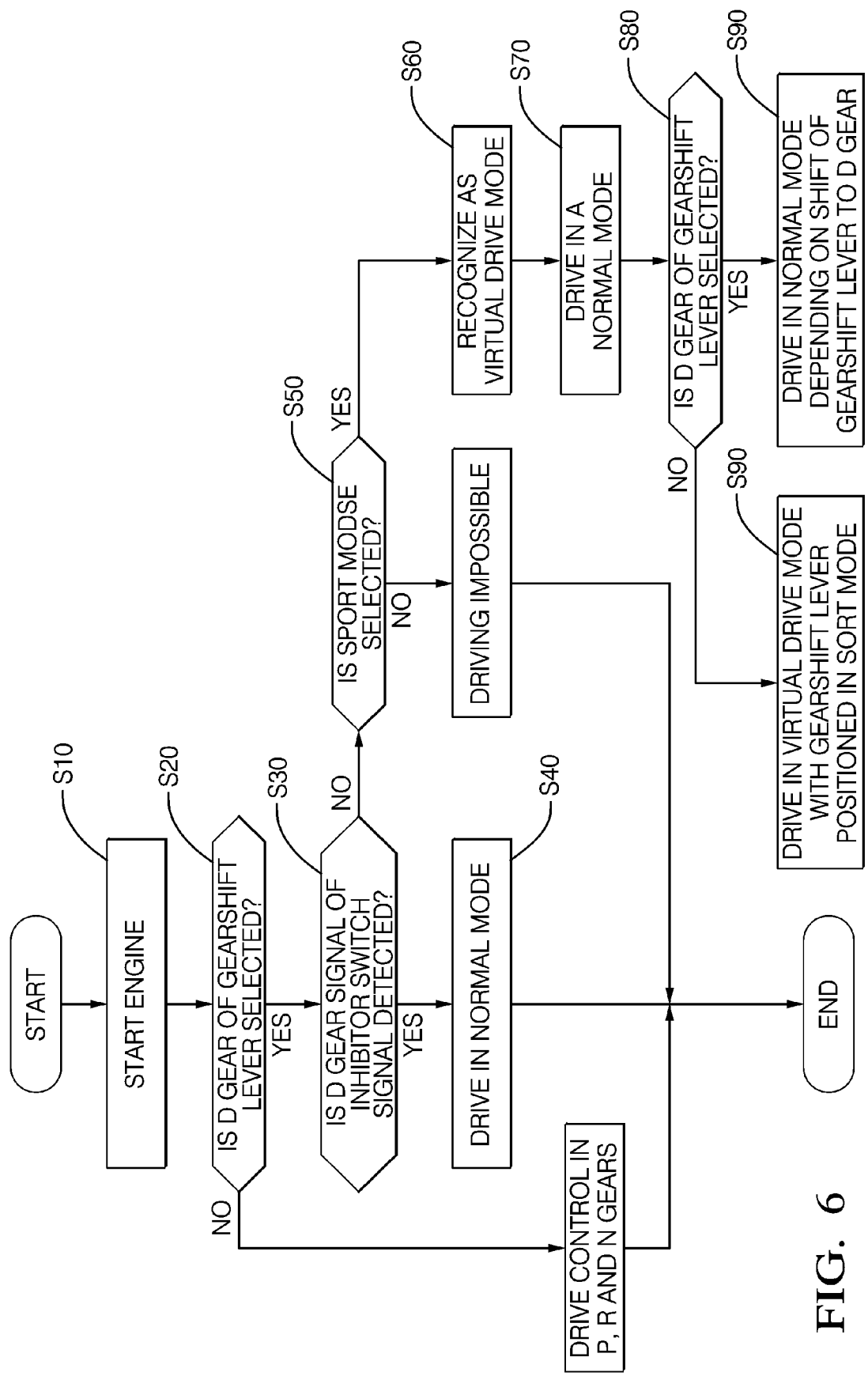
FIG. 6 is a flowchart showing an operation method of an automatic transmission in accordance with an exemplary embodiment of the present invention.

FIG. 6 is a flowchart showing an operation method of an automatic transmission in accordance with an exemplary embodiment of the present invention.

As shown in FIG. 6, a driver turns a key to start an engine in a state in which a gearshift lever is positioned at a P gear of a normal mode (S10). When the engine is started, the driver shifts the gearshift lever from the P gear to a D gear (S20).

When the gearshift lever is shifted to the D gear, the control means 400 detects whether a signal from an inhibitor switch corresponding to the D gear is normally detected.

At this time, when the control means 400 determines that the signal from the inhibitor switch is normally detected (S30), the automobile is controlled in a normal way (S40).

In step S30, the control means 400 determines that the D gear is abnormal when no signal from the inhibitor switch is detected.

That is, when a contact error of the inhibitor switch occurs, i.e., when a cable connected between the gearshift lever and the inhibitor switch is loosened or cut, since there is no signal at the D gear of the inhibitor switch, the control means 400 determines that the D gear of the normal mode malfunctions.

As described above, when it is determined that the D gear malfunctions, the control means 400 controls the detection means to determine whether the gearshift lever is shifted from the normal mode to the sport mode (S50).

That is, in step S50, when the driver determines that the automobile cannot be driven in the normal mode, the driver shifts the gearshift lever from the normal mode to the sport mode.

As the gearshift lever is shifted from the normal mode to the sport mode, the detection means 300 detects the shift of the gearshift lever and sends a detection signal to the control means 400. At this time, the detection means 300, such as a sensor, a virtual drive mode switch, or the like, which is installed between the up/down switches 310 and 320 of the sport mode, detects that the gearshift lever is shifted.

When the gearshift lever is shifted from the normal mode to the sport mode, the control means 400 shifts the gearshift lever to the virtual drive mode like the D gear of the normal mode, such that the automobile can be driven (S60).

In addition, when the virtual drive mode state is maintained, the control means 400 is shifted to the normal mode state like the D gear of the normal mode (S70).

At this time, the control means 400 prevents manual shifting of the gearshift lever in the event that a driver shifts the gearshift lever to the up switch 310 and the down switch 320 of the sport mode. That is, control of the sport mode is limited in the virtual drive mode state.

Further, the control means 400 determines whether the gearshift lever is maintained in the virtual drive mode state or whether the gearshift lever is shifted to the D gear of the normal mode (S80).

Since the driver is not familiar with the virtual drive mode of the sport mode, he/she may shift the gearshift lever to the D gear of the normal mode out of habit.

Therefore, the control means 400 can maintain the automobile driving state, regardless of shifting of the gearshift lever to the virtual drive mode of the sport mode or the normal mode (S90).

As a result, it is possible to continue driving the automobile even when the D gear of the normal mode malfunctions, and to freely drive the automobile, regardless of a driver's habits, even through the gearshift lever may be shifted to the sport mode or the normal mode.

As can be seen from the foregoing, an automobile can be driven, even when a D gear for forward driving malfunctions, by a virtual drive mode switch that is equivalent to the D gear in an emergency.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. An automobile operation apparatus designed for detecting failure of a drive gear selector of an automatic transmission having a normal mode constituted by P, R, N and D gears, and a sport mode, the apparatus comprising:

up/down switches for shifting a gear of the automatic transmission up or down when a gearshift lever is shifted from the normal mode to the sport mode;

a mode selector switch for detecting whether the gearshift lever is shifted to the sport mode; and a transmission controller configured to control the automatic transmission in a virtual drive mode corresponding to a D gear operation when the D gear selector is abnormal and the mode selector switch detects a mode change from the normal mode to the sport mode.

2. The apparatus in accordance to claim 1, wherein the transmission controller is configured to keep the automatic transmission in the virtual drive mode when the D gear selector is abnormal and the mode detector switch detects a mode change from the sport mode back to the normal mode.

* * * * *